(12) United States Patent
Gopalakrishnan

(10) Patent No.: US 12,010,078 B2
(45) Date of Patent: Jun. 11, 2024

(54) METHOD AND APPARATUS FOR MANAGING INTERACTIONS BETWEEN ONLINE USERS

(71) Applicant: Hariharan Gopalakrishnan, Easthampton, MA (US)

(72) Inventor: Hariharan Gopalakrishnan, Easthampton, MA (US)

( * ) Notice: Subject to any disclaimer, the term of this patent is extended or adjusted under 35 U.S.C. 154(b) by 0 days.

(21) Appl. No.: 18/330,164

(22) Filed: Jun. 6, 2023

(65) Prior Publication Data

US 2023/0412536 A1 Dec. 21, 2023

Related U.S. Application Data

(60) Provisional application No. 63/353,563, filed on Jun. 18, 2022.

(51) Int. Cl.
| | |
|---|---|
| *G06F 15/16* | (2006.01) |
| *G06Q 50/00* | (2012.01) |
| *H04L 51/04* | (2022.01) |
| *H04L 51/224* | (2022.01) |
| *H04L 51/52* | (2022.01) |

(52) U.S. Cl.
CPC ............ *H04L 51/04* (2013.01); *G06Q 50/01* (2013.01); *H04L 51/224* (2022.05); *H04L 51/52* (2022.05)

(58) Field of Classification Search
CPC ....... H04L 51/04; H04L 51/224; H04L 51/52; H04L 51/56; H04L 51/58; H04L 51/21; H04L 51/00; G06Q 50/01

USPC .......... 709/206, 204, 205, 217, 219
See application file for complete search history.

(56) References Cited

U.S. PATENT DOCUMENTS

| | | | | |
|---|---|---|---|---|
| 6,807,566 | B1 * | 10/2004 | Bates | H04L 51/212 709/224 |
| 2003/0200267 | A1 * | 10/2003 | Garrigues | H04L 51/212 709/229 |
| 2004/0015554 | A1 * | 1/2004 | Wilson | H04L 51/42 709/206 |
| 2004/0193691 | A1 * | 9/2004 | Chang | H04L 63/08 709/206 |
| 2005/0097176 | A1 * | 5/2005 | Schatz | H04L 51/23 709/206 |
| 2006/0041505 | A1 * | 2/2006 | Enyart | H04L 12/1467 705/40 |
| 2006/0075027 | A1 * | 4/2006 | Zager | G06Q 10/107 709/206 |

(Continued)

*Primary Examiner* — Kaylee J Huang

(57) ABSTRACT

Embodiments herein provide a method for managing interactions between online users by an apparatus. A first user is associated with a first electronic device, a first user profile and a first user profile rating. A second user is associated with a second electronic device, a second user profile and a second user profile rating. The method includes sending from the first user to the second user, a first message and a link to view the first user profile. The method includes displaying on the second electronic device a blurred version of the first message content and a user interface eliciting an input to open or not open the message. The method includes determining whether the second user opens the first message or not. In an embodiment, the method includes incrementing the first and second user profile ratings, in response to determining that the second user opens the first message.

18 Claims, 13 Drawing Sheets

(56) References Cited

U.S. PATENT DOCUMENTS

| | | | |
|---|---|---|---|
| 2011/0161437 A1* | 6/2011 | Cox | G06Q 10/107 |
| | | | 709/206 |
| 2014/0032659 A1* | 1/2014 | Marini | H04L 51/52 |
| | | | 709/204 |
| 2014/0101244 A1* | 4/2014 | Klein | G06Q 10/00 |
| | | | 709/204 |
| 2017/0142048 A1* | 5/2017 | Tyagi | H04W 52/0258 |
| 2018/0350144 A1* | 12/2018 | Rathod | G06Q 20/3224 |
| 2019/0108217 A1* | 4/2019 | Chen | G06F 40/289 |
| 2020/0129864 A1* | 4/2020 | Tran | A63F 13/798 |
| 2023/0171212 A1* | 6/2023 | Hathaway | H04L 51/52 |
| | | | 709/206 |

\* cited by examiner

METHOD AND APPARATUS FOR MANAGING INTERACTIONS BETWEEN ONLINE USERS

PRIORITY DETAILS

The present application is based on, and claims priority from an U.S. Application No. 63/353,563 filed on 18 Jun. 2022, the disclosure of which is hereby incorporated by reference herein.

FIELD

The embodiment herein relates to online user profile management and rating methods, and more particularly to a method and an apparatus for managing interactions between online users.

BACKGROUND

In general, online dating systems do not have user profile rating methods that are driven by the user community. A profile rating method driven by the user community allows all users to identify desirable dating profiles. Further, a user community-driven profile rating method allows all users to recognize fake user profiles, bots, and scamsters. Due to lack of a user community-driven profile rating method, online dating systems resort to deriving matches based on specific criteria listed by individual users such as their interests in movies, sports, and other aspects of life.

Further, online dating systems are either completely free to use or implement subscription methods. Free-to-use systems generally limit the number of matches users are allowed, whereas subscription-based systems do not guarantee a match.

In both, free-to-use and subscription-based systems, restrictions are placed such that users either get very few matches or end up paying too much money. Users dislike both types of systems since they do not get good returns on their time and money spent. Further, users even stop using these systems, considering them ineffective.

Thus, it is desired to address the above-mentioned disadvantages and other shortcomings and provide a useful alternative.

SUMMARY

Accordingly, the embodiment herein discloses a method for managing interactions between online users by an apparatus. The method includes storing a plurality of user profiles associated with a plurality of users. The method includes receiving a first message from a first user from the plurality of users to be sent to a second user from the plurality of users. The first message contains content from the first user. The method includes sending to the second user the first message along with a hyperlink to the first user profile. The method includes displaying a blurred version of the first message content on an electronic device associated with the second user, and a user interface eliciting an input to open or not open the first message. The method includes determining whether the first message is opened or not opened by the second user based on the input received on the user interface of the electronic device associated with the second user. The method includes displaying an unblurred version of the first message content on the electronic device of the second user when the second user opens the first message. The method includes incrementing the first and second user profile ratings when the second user opens the first message. The method includes decrementing the first user profile rating when the second user does not open the first message.

In an embodiment, the method includes notifying the first user when the second user opened the first message sent by the first user.

In an embodiment, the method includes determining the second user is not opened the first message for a specific time interval. Further, the method includes, deleting the first message from an inbox of the second user. Also, the method includes, decrementing a rating of the first user profile when the first message is not opened by the second user.

In an embodiment, the method includes determining the second user is not opened the first message for a specific time interval. Also, the method includes, disabling the first user to send the next message to the second user.

In an embodiment, the method includes determining a ban order to display to the plurality of users based on each user profile rating. The method includes displaying the plurality of user profiles based on the ban order.

In an embodiment, the method includes determining that a user profile rating from the plurality of user profile ratings is less than a profile rating threshold. The method includes performing, at least one of automatically displaying the user profile in a bottom portion, automatically blacklisting the user, and blocking the ability to send a first message to any of the plurality of users for a specific time period, configuring a threshold to limit the number of first messages that a user can send to other users for a specific time period, and allocating a penalty to a user based on the user profile rating.

In an embodiment, the method includes charging the first and second users opened message fees. The fees may be based on the first and second user profile ratings. The fees charged to the first and second users may or may not be the same.

In an embodiment, the method includes determining that some user profile ratings from a plurality of user profile ratings are greater than a rating threshold. The method includes performing at least one of: automatically displaying a badge indicating that the user profile rating is high, providing an option to include an icebreaker activity in the first message while sending the first message to other users, providing an option to convert the rating to a portion of a fixed profile fee as a reward for good behavior, and providing an option to include an immersive virtual world meeting link in the first message while sending the first message to other users.

In an embodiment, the method includes detecting the number of messages exchanged between the first and the second users. The method includes incrementing the first and second user profile ratings based on the number of messages exchanged between the first and second users.

Accordingly, the embodiment herein discloses an apparatus for managing interaction between online users. The apparatus includes a processor, a memory, and a user community-driven profile rating controller coupled with the processor and the memory, configured to store a plurality of user profiles associated with a plurality of users and receiving a first message from a first user from the plurality of users to be sent to a second user from the plurality of users. The first message contains content from the first user. The apparatus sends to the second user the first message and a hyperlink to the first user profile. The apparatus displays a blurred version of the first message on an electronic device associated with the second user, and a user interface eliciting an input to open or not open the first message. The blurred version of the first message comprises of blurred content of the first message. The apparatus determines whether the first message is opened or not opened by the second user based on the input received on the displayed user interface on the electronic device associated with the second user. The apparatus performs one of: displaying an unblurred version of the first message content on the electronic device associated with the second user and subsequently incrementing the first and second user profile ratings when the second user opens the first message, or, decrementing the first user profile rating when the second user does not open the first message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Changes and modifications may be made within the scope of the embodiments herein without departing from the scope thereof, and the embodiments herein include all such modifications.

BRIEF DESCRIPTION OF FIGURES

The embodiment is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
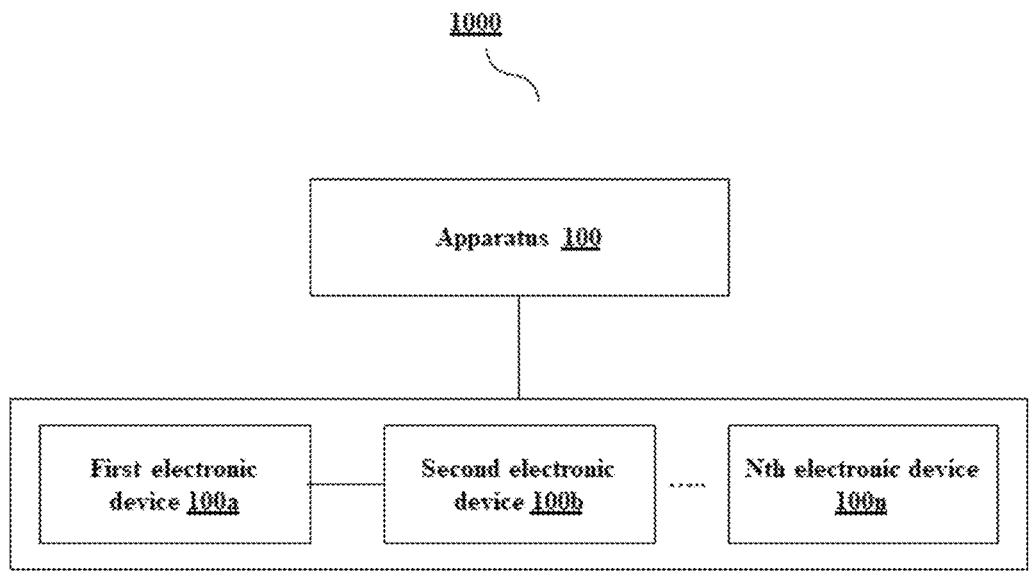
FIG. 1 is a block diagram of the profile managing and rating system (aka "system") for managing interactions between a plurality of users associated with a plurality of electronic devices, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which perform a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are only used to distinguish one element from another.

Accordingly, the embodiment herein discloses a method for managing interaction between online users by an apparatus. The method includes storing a plurality of user profiles associated with a plurality of users. The method includes receiving a first message from a first user from the plurality of users to be sent to a second user from the plurality of users. The first message contains content from the first user. The method includes sending to the second user the first message along with a hyperlink to the first user profile. The method incudes displaying a blurred version of the first message on an electronic device associated with the second user, and a user interface eliciting an input to open or not open the first message. The blurred version of the first message contains blurred content of the first message. Further, the method includes determining whether the first message is opened or not opened by the second user based on the input received on the displayed user interface of the second user. The method includes performing one of displaying an unblurred version of the first message on the electronic device of the second user when the second user opens the first message. The unblurred version of the first message contains unblurred content from the first user. The method includes incrementing a first and second user profile ratings when the second user opens the first message. The method includes decrementing the first user profile rating when the second user does not open the first message.

Accordingly, the embodiment herein discloses an apparatus for managing interaction between online users. The apparatus includes a processor, a memory, and a user community-driven profile rating controller coupled with the processor and the memory configured to store the plurality of user profiles associated with the plurality of users to receive the first message from the first user from the plurality of users to be sent to the second user from the plurality of users. The first message contains content from the first user. The user community-driven profile rating controller sends the first message received from the first user to the second user. The user community-driven profile rating controller displays a blurred version of the first message on the electronic device associated with the second user, and a user interface eliciting an input to open or not open the first message. The blurred version of the first message contains blurred content. The method includes determining whether the first message is opened or not opened by the second user based on the input received on the displayed user interface of the second user. The user community-driven profile rating controller performs one of: displaying an unblurred version of the first message on the electronic device of the second user and subsequently incrementing the first and second user profile ratings when the second user opens the first message, or, decrementing the first user profile rating when the first message is not opened by the second user. The unblurred version of the first message comprises the unblurred content from the first user.

In conventional methods, the online dating systems are either completely free-to-use or implement subscription-based methods. Free-to-use systems limit the number of matches users is allowed, whereas subscription-based systems cannot guarantee a match.

In either of the free-to-use systems and subscription-based systems, restrictions are placed such that either the user ends up paying too much or gets too less a match in comparison to the price paid. Further, the user may even stop using the free-to-use systems and the subscription-based systems considering them ineffective and a waste of time and money.

Unlike conventional methods and systems, the proposed method is used to charge both the first user first user and the second user only when both users want to communicate with each other. When either of the users is not interested in communicating, the system does not charge anything to either of them. For example, once the first user sends a first message to the second user, the second user makes a conscious decision of opening the message after looking at the first user profile. The second user has sufficient time to decide whether to open the message or not. Once the sufficient time period gets expired, the message is automatically deleted from the second user's inbox and the message is also automatically deleted based on certain parameters (like the user's mailbox is full, the user no longer being interested in further matches, the locations of the users have changed, etc.).

The proposed embodiment is used to resolve the limitations of free-to-use and subscription-based systems by ensuring that users get maximum returns on the money spent.

In the proposed embodiments, the second user makes a conscious decision of opening the message after looking at the profile of the first user. The proposed method provides a certain level of visibility to the second user about the first user. In the proposed method, it is not mandatory that the second user opens and views the profile of the first user before opening the message. The option of viewing the profile lies with the second user. The second user has sufficient time to decide whether to open the message or not. After that time elapses, the message is automatically deleted from the second user's inbox. The message is automatically deleted from the second user's inbox based on other parameters also, like second user's mailbox full (in such a case a first come first deleted strategy is deployed), the first user and the second user have found other matches and are no longer interested in further matches, the locations of the first user and the second user have changed, and a match does not make sense based on proximity, or any other parameters.

At any time, the first user knows the status of the messages sent. When the first user finds that the second user is not interested, the first user does not send any further messages, to reduce spamming in the system.

The proposed method is used to provide a community-driven rating of the user profiles and use the community-driven rating to enable messaging between two or more users in an online dating system (for example). Also, the proposed method is used to increase the rate of messaging between desirable user profiles, reduce and eliminate the presence of undesirable and fake user profiles, and facilitate a pay-per-match messaging system.

In the proposed method, an online dating application enhances user experience by assigning a numeric rating to each user profile based on user's messaging activity. When the sending user (i.e., first user profile) sends messages which are opened by receiving users (i.e., second user profile), the sending user gets a higher profile rating thereby indicating to the user community their desirability. But when the sending user sends messages which are not opened by the receiving users, the sending user get a lower profile rating thereby indicating to the user community their undesirability. In an embodiment, when the receiving user is inclined to open as many messages sent to them, the receiving user gets a higher profile rating thereby indicating to the user community their willingness to engage in the messaging.

When two users decide to engage in the messaging, both users must pay a certain fee (pay-per-match) to ensure that the senders do not send out messages to any arbitrary user and the receivers do not open messages from any arbitrary senders thereby automatically improving the quality of ratings.

The proposed method is used to resolve the limitations of free-to-use and subscription-based systems by ensuring that the users get maximum returns on money and time spent. The pay-per-match system charges two users only when both users agree to communicate with each other. When either of the users is not interested in communicating, the system does not charge anything to either of them. The method is used to assist in reducing spamming and improve the user experience. Since the users must pay for every message that is opened, the user will be careful while sending and opening messages.

Although the method is exemplified with an online dating use case it is not limited to online dating. The method can be applied in any system where the users require to be rated amongst a pool of other users to identify the suitable candidates and be applied in any system where a communication channel is to be established between two or more users based on their mutual consent.

Referring to the drawings and more particularly to FIGS. 1 through 15, where similar reference characters denote corresponding features consistently throughout the figures, they are shown preferred embodiments.

FIG. 1 is a block diagram of the profile managing and rating system (aka system") (1000) for managing interactions between a plurality of online users associated with a plurality of electronic devices, according to the embodiments as disclosed herein. The system (1000) is an online dating system but not limited to an online dating system, a social networking system, or a service providing system.

As shown in FIG. 1, the system (1000) includes an apparatus (100), a first electronic device (100a) and a second electronic device (100b). User interaction is managed and facilitated between the first electronic device (100a) and the second electronic device (100b). As shown in FIG. 1, the system (1000) includes the apparatus (100), the first electronic device (100a), the second electronic device (100b), and nth electronic device (100n). User interactions are managed and facilitated between the first electronic device (100a) and one or more of the second electronic device (100b), and the nth electronic device (100n).

The apparatus (100) is a server but not limited to a computer system, a smart phone, a host server, a personal computer, a Personal Digital Assistant (PDA), a tablet computer, a laptop computer, an Internet of Things (IoT), embedded systems, an edge device, and a vehicle to everything (V2X) device.

Figure 8:
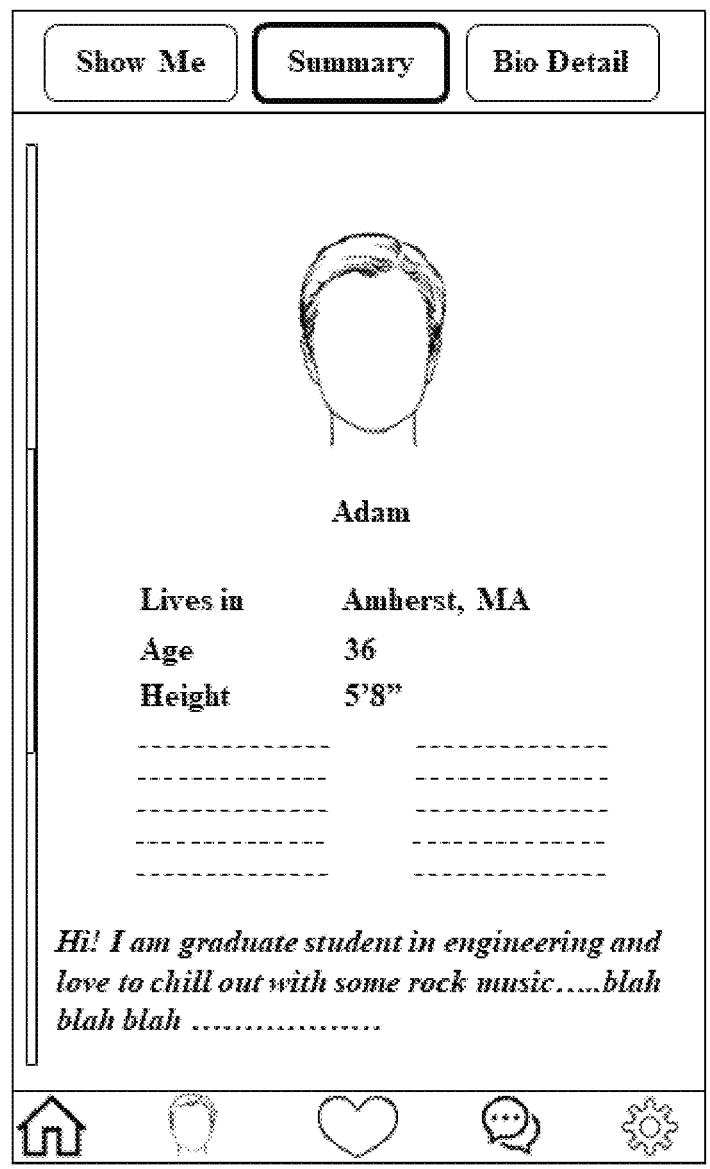
FIG. 8 is an illustration in which a first user profile is depicted, according to the embodiments as disclosed herein.
Figure 9:
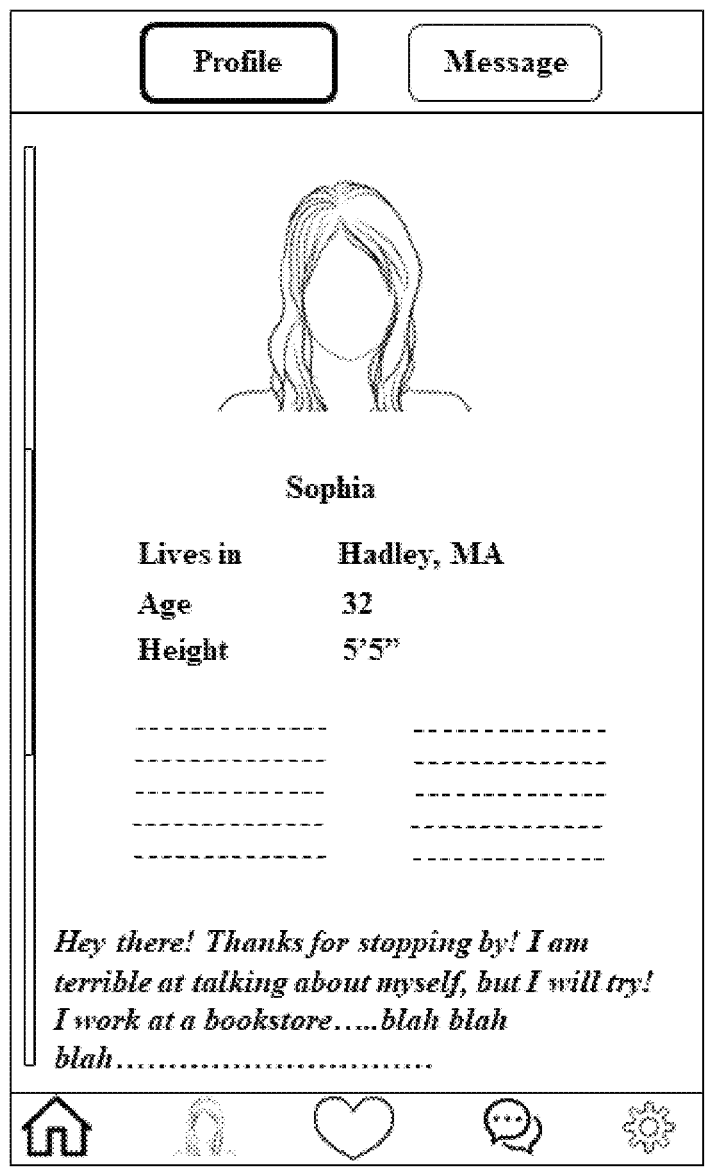
FIG. 9 is an illustration in which a second user profile is depicted, according to the embodiments as disclosed herein.

The apparatus (100) sends a first message by a first user to a second user. The first user is associated with the first electronic device (100a) and the second user is associated with one or more second electronic device (100b), and nth electronic device (100n). The first user includes a first user profile rating, and the second user includes a second user profile rating. The first and second user profile ratings are determined by the system (1000) based on user activity. An example of the first user profile and the second user profile are shown in FIG. 8 and FIG. 9. The apparatus (100) determines whether the second user opens the first message.

The first message contains a blurred version of a first message content and a link to view the first user profile. In an embodiment, the apparatus (100) determines whether the second user opens the first message. Further, the apparatus (100) provides an unblurred version of the first message content to the second user.

Figure 5:
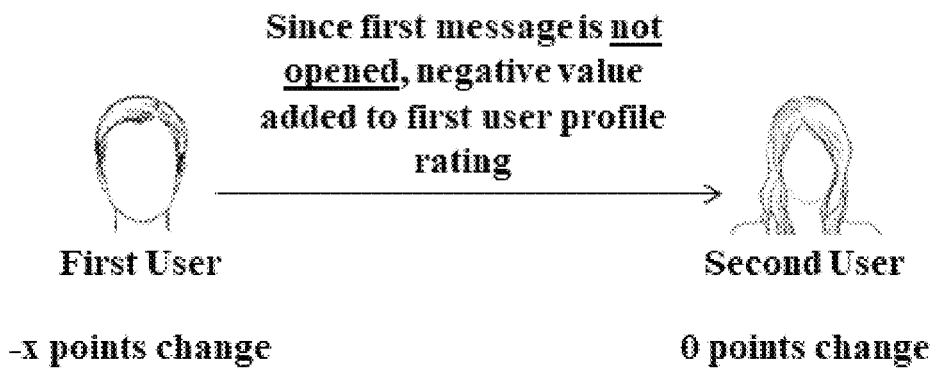
FIG. 5 is an illustration of the system in which a second user does not open a first message from a first user, according to the embodiments as disclosed herein.
Figure 6:
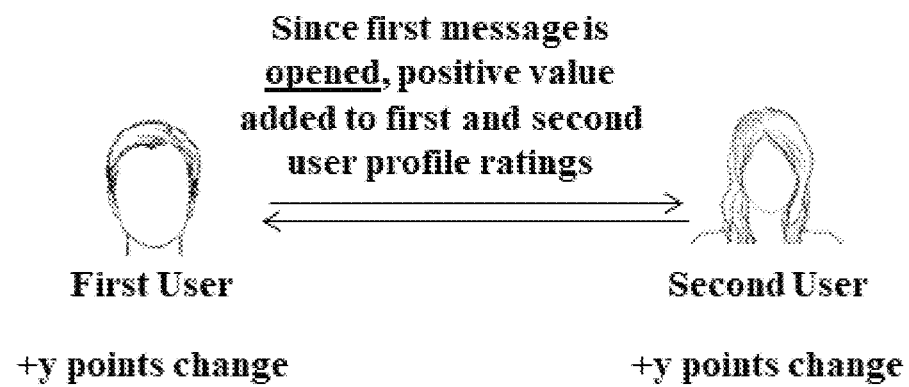
FIG. 6 is an illustration of the system in which the second user opens the first message from the first user, according to the embodiments as disclosed herein.
Figure 7:
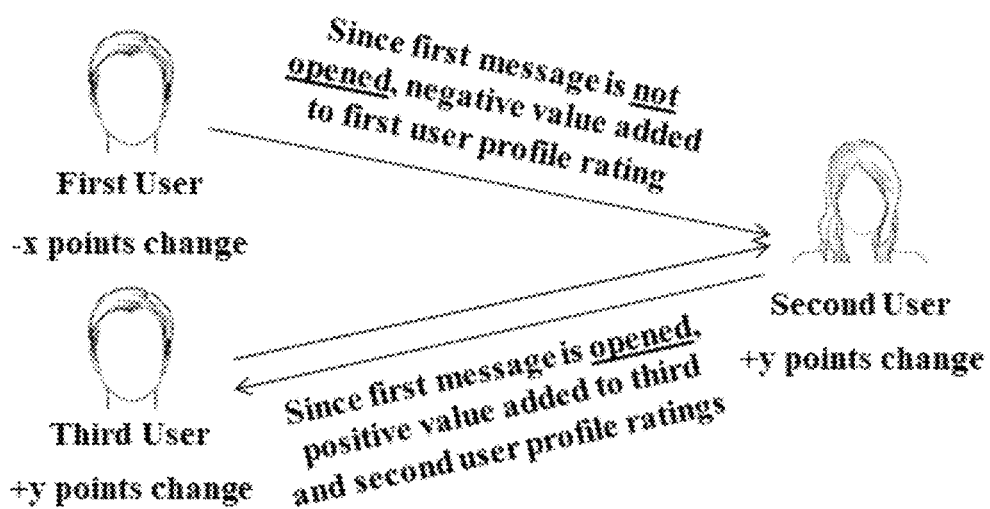
FIG. 7 is an illustration of the system in which multiple users send first messages to the second user and the second user opens only some of the first messages, according to the embodiments as disclosed herein.

In response to determining that the second user opens the first message, in an embodiment, the apparatus (100) increments the first and second user profile ratings. In response to determining that the second user does not open the first message, in another embodiment, the apparatus (100) decrements the first user profile rating. In an example, a second user does not open the first message from a first user as shown in FIG. 5. In an example, a second user opens the first message from a first user as shown in FIG. 6. In an example, multiple users send first messages to a second user and the second user opens only some of the first messages as shown in FIG. 7.

Further, the apparatus (100) determines the user profile rating associated with each of a plurality of users. Further, the apparatus (100) determines an order to display each of the plurality of user profiles based on the user profile rating. The user profile with the highest profile rating is displayed first in the order to display. In an embodiment, the user configures the user profile with the highest profile rating displayed first in the order to display. In another embodiment, the system (1000) itself configures the user profile with the highest profile rating to be displayed first in the order to display.

Further, the apparatus (100) determines that the first user profile rating associated with the first user is less than a rating threshold. The rating threshold is set by the user or the system (1000). In an embodiment, the apparatus (100) automatically displays the first user profile in a bottom portion of the order to display the plurality of user profiles and any other portion of the apparatus (100). In another embodiment, the apparatus (100) automatically blacklists the first user profile based on the first user profile rating and blocks an ability to send a first message to any of the plurality of users for a specific time period. The specific time period is a finite duration but not limited to one day, one week, one month, or similar such durations. In an embodiment, the apparatus (100) provides a threshold on the number of first messages that the first user can send to any of the plurality of users at a given instant of time. In an embodiment, the apparatus (100) applies a penalty to the first user, where the penalty is determined based on the first user profile rating. In an embodiment, when the first user profile rating is high, the penalty is low. In another embodiment, when the first user profile rating is low, the penalty is high.

Further, the apparatus (100) determines whether the second user opens the first message. In an embodiment, the apparatus (100) charges a first opened message fee to the first user and a second opened message fee to the second user, in response to determining that the second user opens the first message. The first opened message fee for the first user is determined based on the first user profile rating and the second opened message fee is determined based on the second user profile rating.

Further, the apparatus (100) determines that the first user profile rating associated with the first user is greater than the rating threshold. In an embodiment, the apparatus (100) automatically displays a badge indicating that the rating associated with the first user is greater than the rating threshold. In another embodiment, the apparatus (100) provides an option to include an icebreaker activity in the first message while sending the first message to the second user. For example, the icebreaker activity is adding some activities in the first message like adding jokes, adding puzzles, adding links to games, adding reels, etc. which stimulates the second user to respond to the first message received from the first user. In another embodiment, the apparatus (100) provides an option to convert the first user profile rating to a portion of a fixed user profile fee as a reward for good behavior. In another embodiment, the apparatus (100) provides an option to include an immersive virtual world meeting link in the first message while sending the first message to the second user.

Further, the apparatus (100) determines that a specific number of messages is exchanged between the first and second users. In an embodiment, the apparatus (100) automatically upgrades the first and second user profile ratings, in response to determining that a specific number of messages is exchanged between the first and second users.

Figure 2:
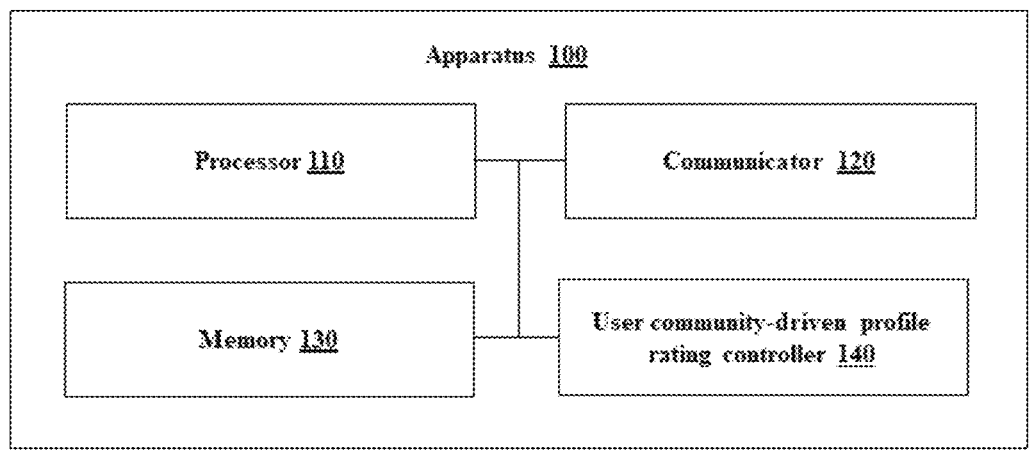
FIG. 2 is a block diagram of an electronic device for managing interactions between the plurality of users, according to the embodiments as disclosed herein.

FIG. 2 is a block diagram of the apparatus (100) for managing interaction between the users, according to the embodiments as disclosed herein. In an embodiment, the apparatus (100) includes a processor (110), a communicator (120), a memory (130) and a user community-driven profile rating controller (140). The processor (110) is coupled with the communicator (120), the memory (130) and the rating controller (140).

The term "user community-driven profile rating controller (140)" and "rating controller (140)" are used interchangeably throughout the specification.

The rating controller (140) sends the first message from the first user to the second user. The first user has a first user profile rating, and the second user has a second user profile rating. The first message contains a blurred version of the first message content and a link to view the first user profile. In an embodiment, the rating controller (140) determines whether the second user opens the first message. Further, the rating controller (140) provides an unblurred version of the first message content to the second user.

In response to determining that the second user opens the first message, in an embodiment, the rating controller (140) increments the first and second user profile ratings. In response to determining that the second user does not open the first message, in another embodiment, the rating controller (140) decrements the first user profile rating.

Further, the rating controller (140) determines the user profile rating associated with each of the plurality of user profiles. Further, the rating controller (140) determines the order to display each of the plurality of user profiles based on the profile rating, where the user profile with the highest profile rating is displayed first in the order to display.

Further, the rating controller (140) determines that the first user profile rating associated with the first user profile is less than the profile rating threshold. In an embodiment, the rating controller (140) automatically displays the first user profile in the bottom portion of the order to display the plurality of user profiles. In another embodiment, the rating controller (140) automatically blacklists the first user profile based on the first user profile rating and blocks the ability to send a first message to any of the plurality of users for specific time period. In an embodiment, the rating controller (140) provides the threshold on the number of first messages that the first user can send to any of the plurality of users at any given instant of time. In an embodiment, the rating controller (140) applies the penalty to the first user profile. The penalty is determined based on the first user profile rating.

Further, the rating controller (140) determines that the second user opens the first message. In an embodiment, the rating controller (140) charges a first opened message fee to the first user and a second opened message fee to the second user, in response to determining that the second user opens the first message. The first message fee for the first user is determined based on the first user profile rating and the second opened message fee for the second user is determined based on the second user profile rating.

Further, the rating controller (140) determines that the first user profile rating associated with the first user is greater than the profile rating threshold. In an embodiment, the rating controller (140) automatically displays the badge indicating that the first user profile rating is greater than the profile rating threshold. In another embodiment, the rating controller (140) provides the option to include the icebreaker activity in the first message while sending the first message to the second user. In another embodiment, the rating controller (140) provides the option to convert the first user profile rating to the portion of the fixed profile fee as a reward for good behavior. In another embodiment, the rating controller (140) provides the option to include the immersive virtual world meeting link in the first message while sending the first message to the second user.

Further, the rating controller (140) determines that a specific number of messages is exchanged between the first and the second users. In an embodiment, the rating controller (140) automatically increments the first and second user profile ratings, in response to determining that a specific number of messages is exchanged between the first and second users.

The rating controller (140) is implemented by analog and/or digital circuits such as logic gates, integrated circuits, the processor (110), microprocessors, microcontrollers, memory circuits, passive electronic components, active electronic components, optical components, hardwired circuits, and the like, and may optionally be driven by firmware.

At least one of the plurality of modules/components of the rating controller (140) is implemented through an Artificial Intelligence (AI) model. A function associated with the AI model is performed through the memory (130) and the processor (110). The one or a plurality of processors controls the processing of the input data in accordance with a predefined operating rule or the AI model stored in the non-volatile memory and/or the volatile memory. The predefined operating rule or artificial intelligence model is provided through training and/or learning.

Here, being provided through learning means that, by applying a learning process to a plurality of learning data, a predefined operating rule or AI model of a desired characteristic is made. The learning is performed in a device itself in which AI according to an embodiment is performed, and/or is implemented through a separate server/system.

The AI model consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), Deep Belief Network (DBN), bidirectional recurrent deep neural network (BRDNN), Generative Adversarial Networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although FIG. 2 is a block diagram of the apparatus (100), it is to be understood that other embodiments are not limited thereon. In other embodiments, the apparatus (100) includes less or greater number of components. Further, the labels or names of the components are used only for illustrative purpose and does not limit the scope of the invention. One or more components are combined to perform same or similar function in the apparatus (100).

Figure 3:
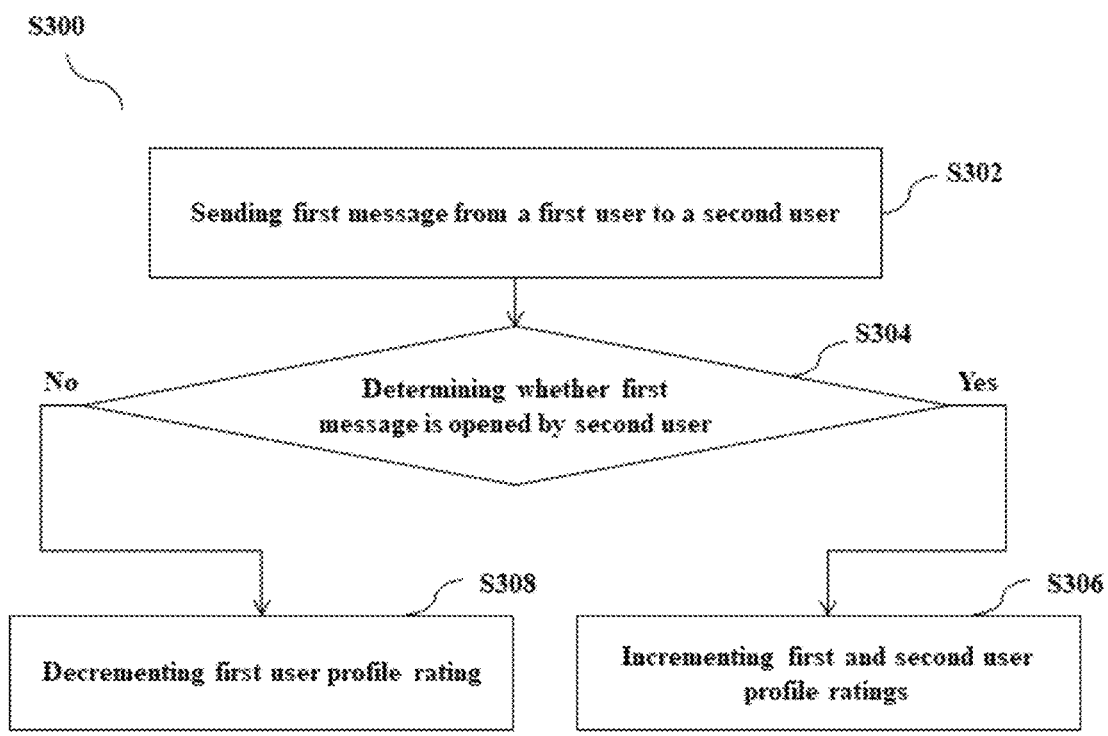
FIG. 3 is a flow chart illustrating a method for managing interactions between the users, according to the embodiments as disclosed herein.

FIG. 3 is a flow chart (S300) illustrating a method for managing interaction between the users, according to the embodiments as disclosed herein. The operations (S302-S308) are managed by the rating controller (140).

At step S302, the method includes sending the first message by the first user to the second user. The first user profile includes the first user profile rating, and the second user profile includes the second user profile rating.

At step S304, the method includes determining whether the second user opens the first message. The first message contains the blurred version of the first message content and the link to view the first user profile.

At step S306, the method includes incrementing the first and second user profile ratings in response to determining that the second user opens the first message.

At step S308, the method includes decrementing the first user profile rating in response to determining that the second user does not open the first message.

Figure 4:
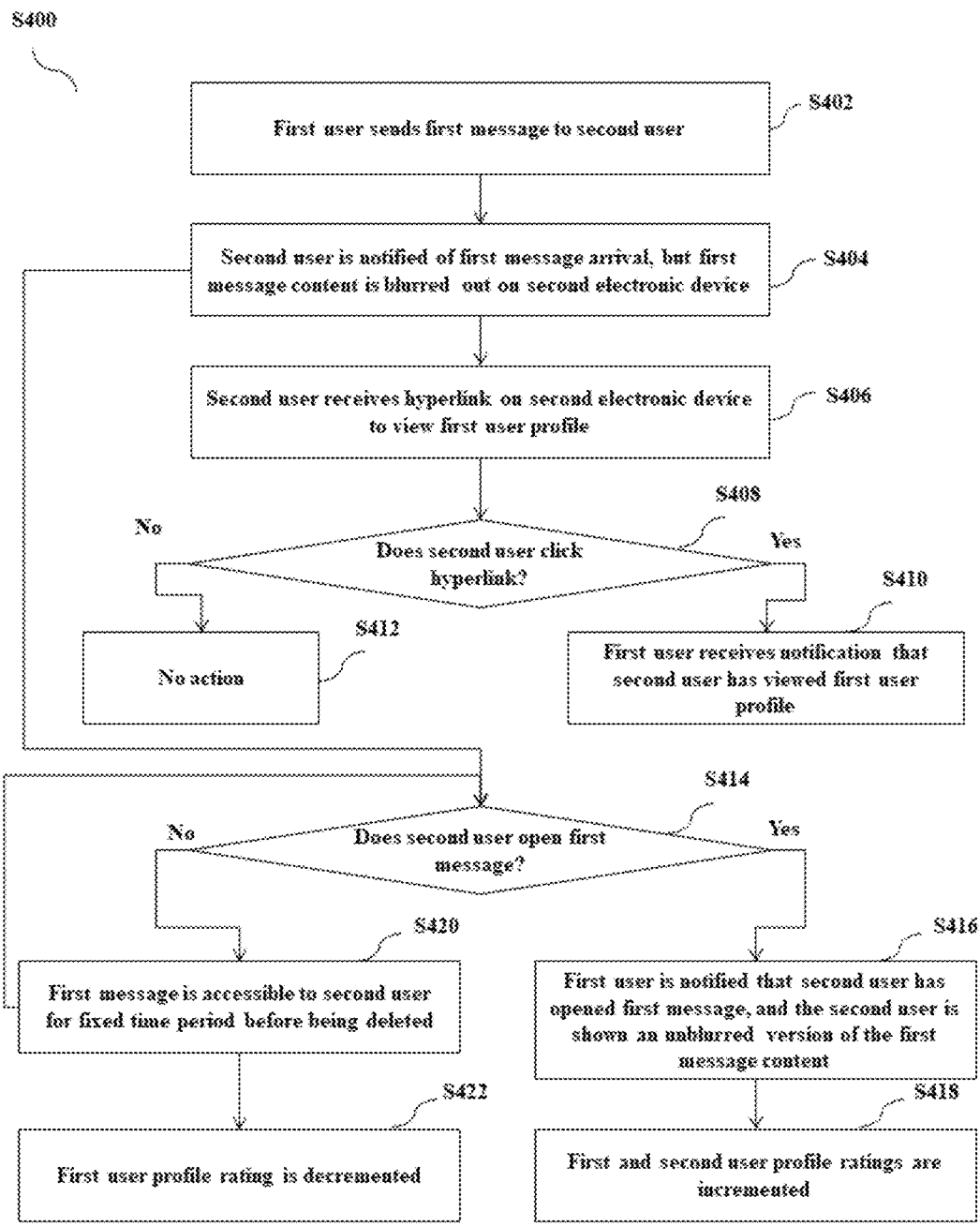
FIG. 4 is an example flow chart illustrating a method for managing interactions between the users, according to the embodiments as disclosed herein.

FIG. 4 is an example flow chart (S400) illustrating a method for managing interaction between users, according to the embodiments as disclosed herein.

At step S402, the first user associated with the first electronic device (100a) sends the first message to the second user associated with the second electronic device (100b).

At step S404, the second user associated with the second electronic device (100b) is notified of the first message arrival, but the first message contents are blurred out on the second electronic device (100b).

At step S406, the system (1000) provides the hyperlink on the second electronic device (100b), where the hyperlink navigates the first user profile page associated with the first electronic device (100a).

At step S408, the system (1000) determines whether the second user clicks the hyperlink.

At step S410, the first electronic device (100a) receives a notification that the second user has viewed the first user profile page in response to the second user clicking the hyperlink.

At step S412, the method does not perform any action in response to the second user not clicking the hyperlink.

At step S414, the system (1000) determines whether the second user opens the first message.

At step 416, the first user is notified that the second user has opened the first message, and the second user is shown an unblurred version of the first message content.

At step S418, the first user profile rating associated with the first electronic device (100a) and the second user profile rating associated with the second electronic device (100b) are incremented by pre-determined numeric values in response to the second user opening the first message.

At step S420, the first message is accessible to the second user associated with the second electronic device (100b) for a pre-determined amount of time before being deleted in response to the second user not opening the message within the pre-determined amount of time.

At step S422, after the message is deleted, the first and second users are notified that message has been withdrawn from the inbox of the second user and profile rating of the second user remains unchanged, but profile rating of the first user is being decremented.

FIG. 5 is an illustration of the profile managing and rating system (1000) in which the second user does not open the first message from the first user, according to the embodiments as disclosed herein.

In an embodiment, the first user is sending the first message to the second user. When the first message is not opened by the second user, the first user points (rating) get decremented, and the second user points (ratings) remain the same. A negative value is added to the first user.

FIG. 6 is an illustration of the profile managing and rating system (1000) in which the second user opens the first message from the first user, according to the embodiments as disclosed herein.

In an embodiment, the first user is sending the first message to the second user. When the first message is opened by the second user, both the first user and the second user points (ratings) get incremented and a positive value is added to both first and second user profile ratings.

FIG. 7 is an illustration of the profile managing and rating system (1000) in which multiple users send first messages to the second user and the second user opens only some of the first messages, according to the embodiments as disclosed herein.

In an embodiment, the second user receives first messages from the first user and the third user. When the second user opens the first message which is received from the third user, the points (ratings) get incremented for both, the third user and the second user. The positive value is added to both, the third user and the second user. When the second user does not open the first message which is received from the first user, the points (ratings) get decremented for the first user but the second user's points (ratings) remain the same. The negative value is added to the first user profile rating.

FIG. 8 is an illustration in which the first user profile is depicted, according to the embodiments as disclosed herein. In an example, the first user profile includes an age, name, location, height, weight, hobby, and lifestyle.

FIG. 9 is an illustration in which the second user profile is depicted, according to the embodiments as disclosed herein. In an example, the second user profile includes age, name, location, height, weight, hobby, and lifestyle.

Figure 10:
FIG. 10 is an illustration in which a notification given to the first user about the system is depicted, according to the embodiments as disclosed herein.

FIG. 10 is an illustration in which the notification given to the first user about the profile managing and rating system (1000) is depicted, according to the embodiments as disclosed herein. The first and second user profile ratings increase when the second user opens the first message sent by the first user. Otherwise, the first user profile rating decreases and the second user profile rating remains unchanged when the second user does not open the first message, or a specific time period has lapsed since the delivery of the first message to the second user's inbox.

Figure 11:
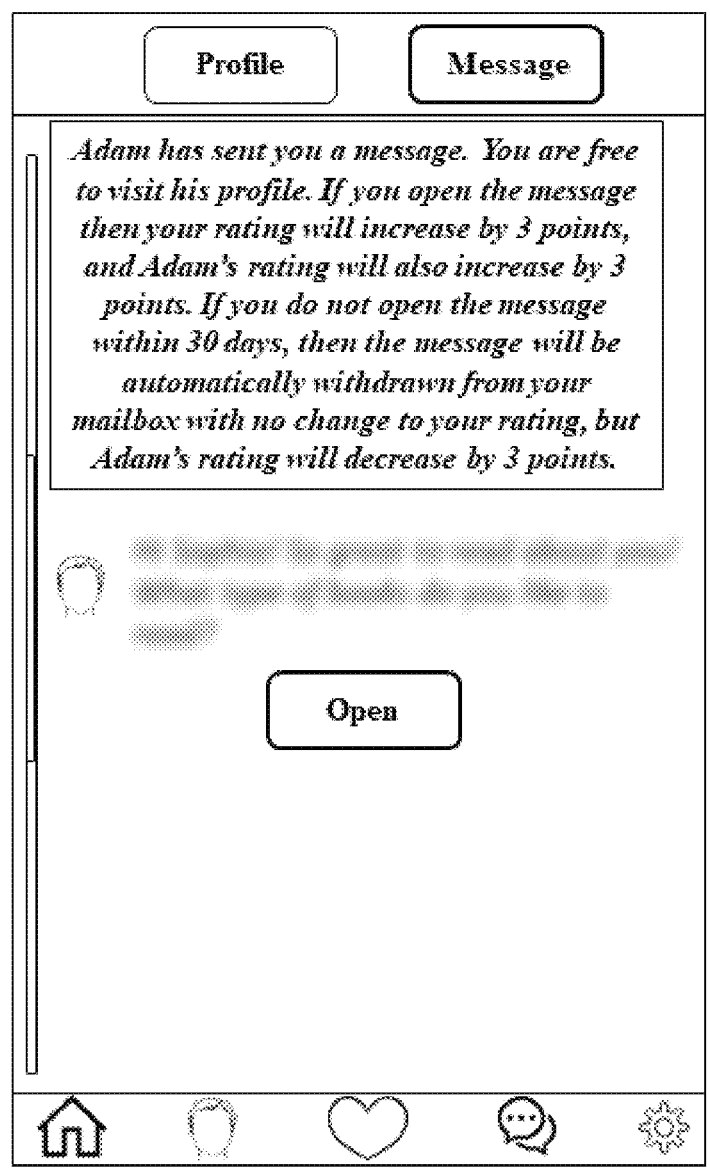
FIG. 11 is an illustration in which a notification given to the second user about the system and the arrival of a first message is depicted, according to the embodiments as disclosed herein.

FIG. 11 is an illustration in which the notification given to the second user about the arrival of a new first message is depicted, according to the embodiments as disclosed herein.

The first message is blurred out and the second user is instructed that they are free to view the first user's profile, and both the first and second user profile ratings are incremented when the second user opens the message, and the first user profile rating is decremented, and the second user profile rating remains unchanged when the second user does not open the message.

Figure 12:
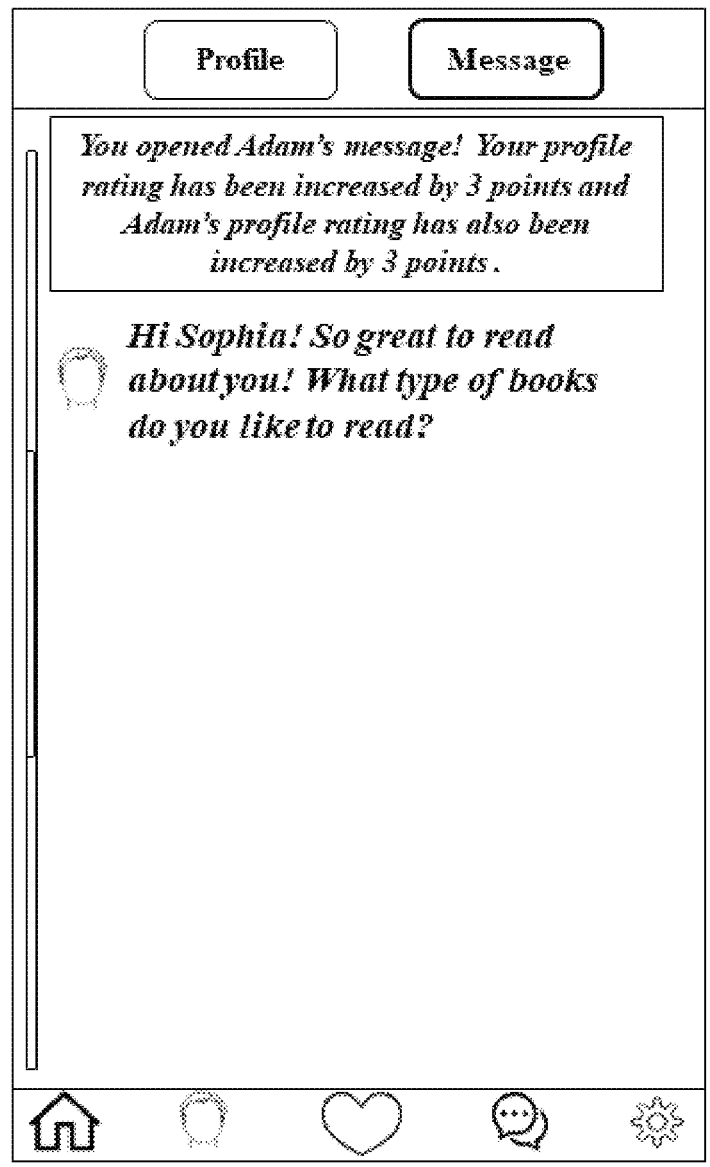
FIG. 12 is an illustration in which a notification given to the second user when the second user chooses to open the first message is depicted, according to the embodiments as disclosed herein.

FIG. 12 is an illustration in which the notification given to the second user when the second user chooses to open the received first message is depicted, according to the embodiments as disclosed herein. The first message is revealed to the second user and the second user is notified that both the first and second user profile ratings have been incremented.

Figure 13:
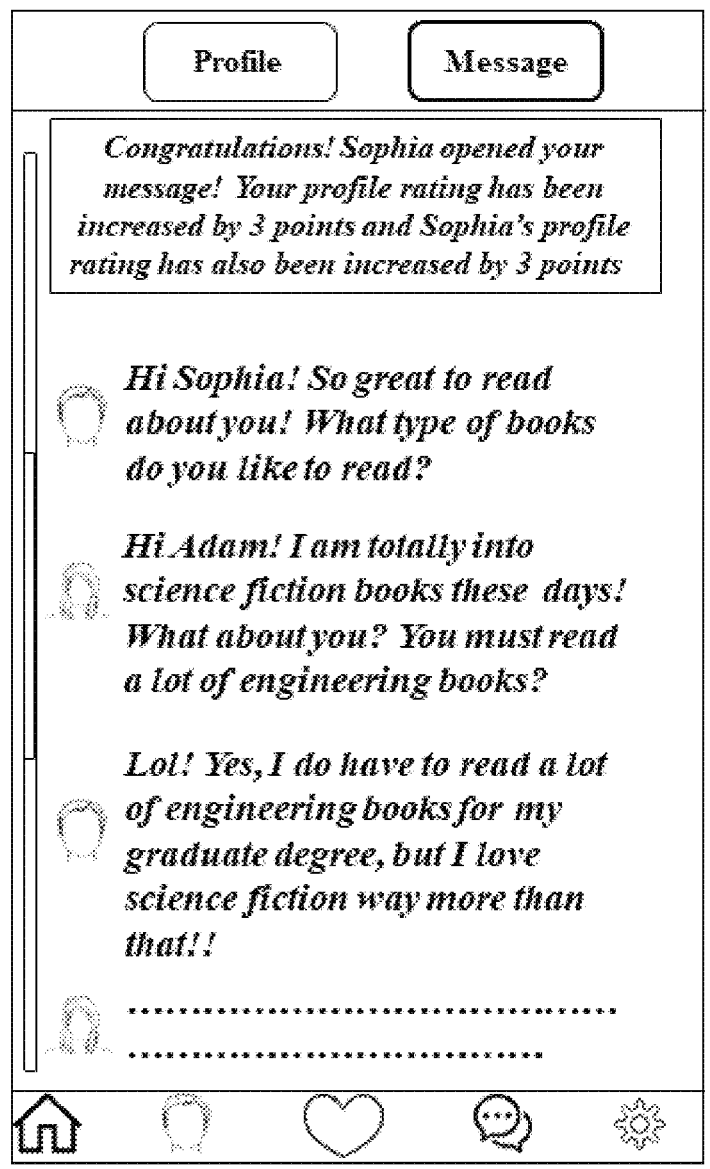
FIG. 13 is an illustration in which a notification given to the first user when the second user chooses to open the first message, and further communication between the first and second users is depicted, according to the embodiments as disclosed herein.

FIG. 13 is an illustration in which communication between the first and second users after the second user has opened the first message is depicted, according to the embodiments as disclosed herein.

Figure 14:
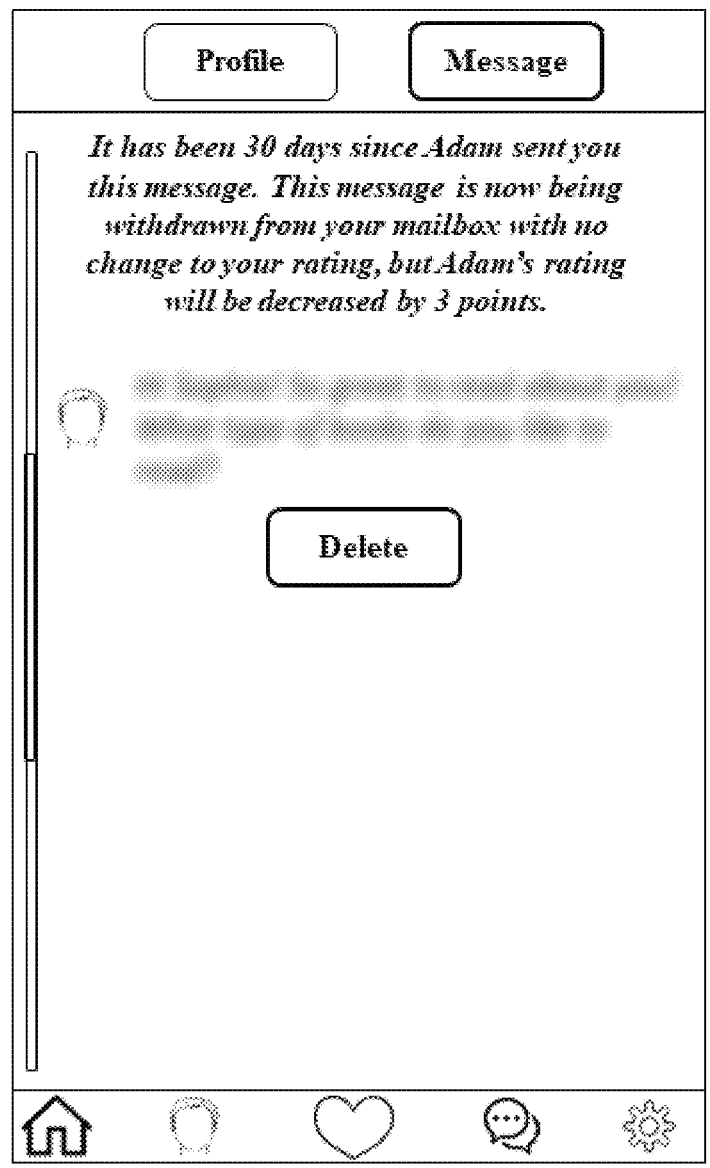
FIG. 14 is an illustration in which a notification given to the second user that a specific time period has elapsed, and the first message is being withdrawn from the second user's inbox with no change to second user profile rating, but the first user profile rating is being decremented is depicted, according to the embodiments as disclosed herein.

FIG. 14 is an example illustration in which the notification given to the second user that a specific time period has elapsed, and the first message is being withdrawn from the second user's inbox with no change to second user profile rating, but the first user profile rating is being decremented is depicted, according to the embodiments as disclosed herein.

Figure 15:
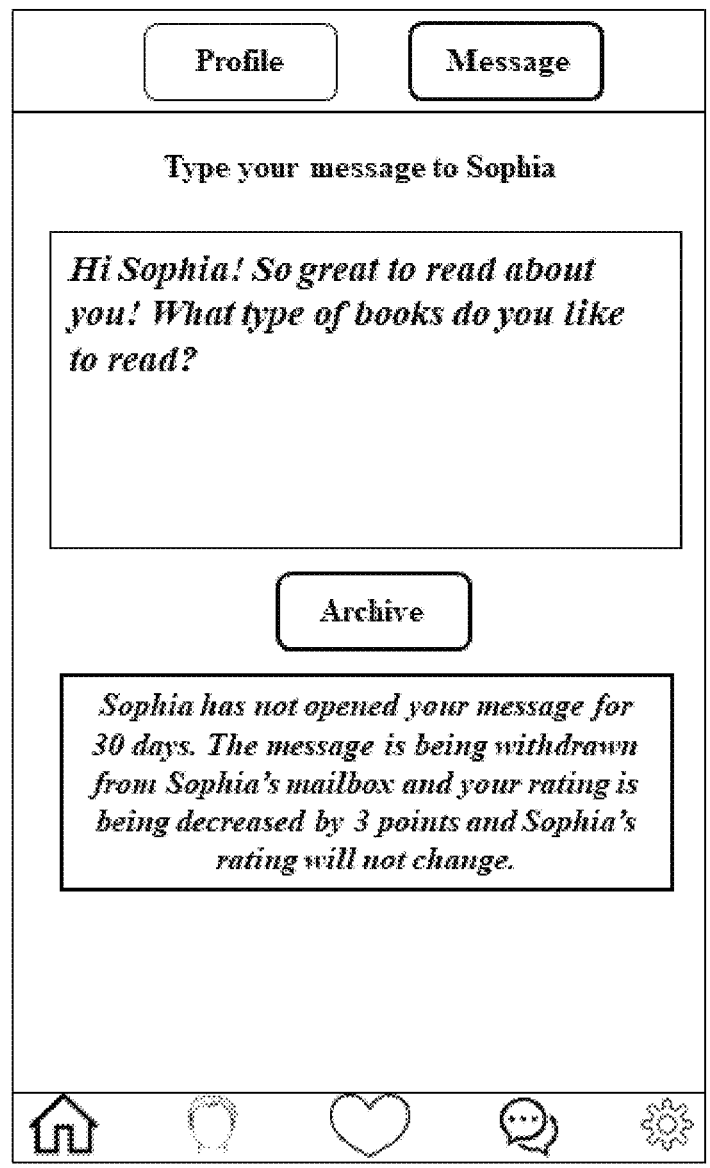
FIG. 15 is an illustration in which the notification given to the first user that a specific time period has elapsed, and the first message is being withdrawn from the second user's inbox with no change to second user profile rating, but the first user profile rating is being decremented is depicted, according to the embodiments as disclosed herein.

FIG. 15 is an illustration in which the notification given to the first user that a specific time period has elapsed, and the first message is being withdrawn from the second user's inbox with no change to second user profile rating, but the first user profile rating is being decremented is depicted, according to the embodiments as disclosed herein. In another embodiment, the second user may not immediately open the first message from the first user and keep it for some time in the inbox to revisit in future.

In another embodiment, the message is removed automatically from the inbox of the second user based on certain criteria like time elapsed, number of messages pending, locations of the first user and locations of the second user, other matches found by the first and second users.

Unlike conventional methods and systems, the proposed method is used to charge both, the first user and the second user only when both users agree to communicate with each other. When either of the users is not interested in communicating, the system (1000) does not charge anything to either of them. For example, once the first user sends the first message to the second user, the second user makes the conscious decision of opening the first message after looking at the profile of the first user. The second user has sufficient time to decide whether to open the first message or not. Once the sufficient time period elapses, the message is automatically deleted from the second user's inbox and the message is also automatically deleted based on certain parameters (like the second user's mailbox is full, the user is no longer interested in further matches, the locations of the first user and second user have changed, etc.).

The proposed method is used to resolve the limitations of free-to-use and subscription-based systems by ensuring that users get the maximum returns on the money spent.

In the proposed method, the second user makes a conscious decision of opening the first message after looking at the profile of the first user. The proposed method provides a certain level of visibility to the second user about the first user. In the proposed method, it is not mandatory that the second user opens and views the profile of the first user before opening the first message. The option of viewing the profile lies with the second user. The second user has sufficient time to decide whether to open the first message or not. After that time elapses, the first message is automatically deleted from the second user's inbox. The first message is also automatically deleted from the second user's inbox based on other parameters also, like second user's mailbox full (in such a case a first come first deleted strategy may be deployed), the first user and second user have found other matches and are no longer interested in further matches, the locations of the first user and the second user have changed, and a match does not make sense based on proximity, or any other parameters.

At any time, the first user finds the status of the messages sent. When the first user finds that the second user is not interested, the first user may not send any further messages. This would reduce spamming.

The proposed method is used to provide a user community-driven rating of the user profiles and uses that rating to enable messaging between two or more users in the online dating system. The proposed method is used to increase the rate of messaging between desirable user profiles, reduce and eliminate the presence of undesirable and fake user profiles, and facilitate a pay-per-match messaging system.

The proposed method relates to profile rating, fake user identification and payments in online dating and social messaging systems. Besides online dating and social messaging systems, the proposed method is also applicable to any system where a communication mechanism is to be established between two or more users based on their user profile ratings and mutual consent. The system is not limited to online dating systems. It is used in any system where communication is to be established between two or more users depending on their mutual consent. The system can be applied seamlessly to more than two users.

The messages are text messages, voice, video, or any other forms of messages that the users wish to communicate with.

The various actions, acts, blocks, steps, or the like in the flow charts (S300 and S400) may be performed in the order presented, in a different order or simultaneously. Further, in some embodiments, some of the actions, acts, blocks, steps, or the like may be omitted, added, modified, skipped, or the like without departing from the scope of the proposed embodiments.

The foregoing description of the specific embodiments will so fully reveal the general nature of the embodiments herein that others can, by applying current knowledge, readily modify and/or adapt for various applications of such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

I claim:

1. A method for managing interactions between online users by an apparatus (100), wherein the method comprises:
   storing, by the apparatus (100), a plurality of user profiles associated with a plurality of users;
   receiving, by the apparatus (100), a first message from a first user of the plurality of users to be sent to a second user of the plurality of users, wherein the first message comprises content from the first user;
   sending, by the apparatus (100), the first message and a link of a first user profile of the plurality of user profiles to the second user;
   displaying, by the apparatus (100), a blurred version of the first message on an electronic device (100*b*) associated with the second user, wherein the blurred version comprises blurred content of the first message, and, a user interface eliciting an input to open or not open the first message;
   determining, by the apparatus (100), whether the first message is opened or not opened by the second user based on the input received on the user interface displayed on the electronic device (100*b*) of the second user;
   performing, by the apparatus (100):
   displaying an unblurred version of the first message on the electronic device (100*b*) of the second user when the second user opens the first message, wherein the unblurred version comprises unblurred content of the first message, and incrementing a first user profile rating and a second user profile rating, when the second user opens the first message, and
   decrementing the first user profile rating when the second user does not open the first message.

2. The method as claimed in claim 1, wherein determining, by the apparatus (100), whether the second user opens the first message, based on the input received on the user interface displayed on the electronic device (100*b*) associated with the second user comprises:
   notifying, by the apparatus (100), the first user when the second user has opened the first message.

3. The method as claimed in claim 1, wherein decrementing the first user profile rating when the second user does not open the first message comprises:
   determining, by the apparatus (100), whether the second user has not opened the first message for a specific time period;
   deleting, by the apparatus (100), the first message from an inbox of the second user; and
   decrementing, by the apparatus (100), the first user profile rating.

4. The method as claimed in claim 3, comprises:
   disabling, by the apparatus (100), an ability of the first user to send a next message to the second user when the second user has not opened the first message for the specific time period.

5. The method as claimed in claim 1, comprises:
   determining, by the apparatus (100), an order to display the plurality of user profiles based on user profile rating of each user profile from the plurality of user profiles; and
   displaying, by the apparatus (100), the plurality of user profiles based on the determined order.

6. The method as claimed in claim 1, comprises:
   determining, by the apparatus (100), that a user profile rating from a plurality of ratings is less than a rating threshold; and
   performing, by the apparatus (100), at least one of:
   automatically displaying a user profile corresponding to the user profile rating less than the rating threshold in a bottom portion,
   automatically blacklisting a user corresponding to the user profile rating less than the rating threshold and blocking an ability of the user for a specific time period to send a first message to any of the plurality of users,
   configuring a threshold to limit for the specific time period based on a number of first messages that the user sends to other users, and
   applying a penalty to the user corresponding to the user profile rating less than the rating threshold based on the user profile rating of the user.

7. The method as claimed in claim 1, wherein when the second user opens the first message, the method comprises:
   determining, by the apparatus (100), a first opened message fee based on the first user profile rating;
   determining, by the apparatus (100), a second opened message fee based on the second user profile rating;
   charging, by the apparatus (100), the first opened message fee to the first user and the second opened message fee to the second user.

8. The method as claimed in claim 1, comprises:
   determining, by the apparatus (100), that a user profile rating from a plurality of ratings is greater than a rating threshold; and
   performing, by the apparatus (100), at least one of:
   automatically displaying a badge on a user profile corresponding to the user profile rating greater than the rating threshold,
   providing a user corresponding to the user profile rating greater than the rating threshold an option to include an icebreaker activity in the first message,
   providing the user, corresponding to the user profile rating greater than the rating threshold, an option to convert the user profile rating to a portion of a fixed profile fee, and
   providing the user, corresponding to the user profile rating greater than the rating threshold, an option to include an immersive virtual world meeting link in the first message.

9. The method as claimed in claim 1, wherein when the second user opens the first message, the method comprises:
   detecting, by the apparatus (100), a number of messages exchanged between the first user and the second user; and
   incrementing, by the apparatus (100), the first user profile rating and the second user profile rating based on the number of messages exchanged between the first user and the second user.

10. An apparatus (100) for managing interactions between online users, wherein the apparatus (100) comprises:
    a processor (110);
    a memory (130); and
    a user community-driven profile rating controller (140), coupled with the processor (110) and the memory (130), configured to:
    store a plurality of user profiles associated with a plurality of users;

receive a first message from a first user of the plurality of users to be sent to a second user of the plurality of users, wherein the first message comprises content from the first user;

send the first message and a link of a first user profile of the plurality of user profiles to the second user;

display a blurred version of the first message on an electronic device (100b) associated with the second user, wherein the blurred version comprises blurred content of the first message, and, a user interface eliciting an input to open or not open the first message;

determine whether the first message is opened or not opened by the second user based on the input received on the user interface displayed on the electronic device (100b) of the second user;

perform:

display an unblurred version of the first message on the electronic device (100b) of the second user when the second user opens the first message, wherein the unblurred version comprises unblurred content of the first message, and incrementing a first user profile rating and a second user profile rating, when the second user opens the first message, and decrement the first user profile rating when the second user does not open the first message.

11. The apparatus (100) as claimed in claim 10, wherein the user community-driven profile rating controller (140) is configured to:

notify the first user when the second user has opened the first message sent by the first user.

12. The apparatus (100) as claimed in claim 10, wherein the user community-driven profile rating controller (140) is configured to:

determine that the second user has not opened the first message for a specific time period;

delete the first message from an inbox of the second user; and decrement the first user profile rating when the second user does not open the first message.

13. The apparatus (100) as claimed in claim 12, wherein the user community-driven profile rating controller (140) is configured to:

disable an ability of the first user to send a next message to the second user when the second user has not opened the first message for the specific time period.

14. The apparatus (100) as claimed in claim 10, wherein the user community-driven profile rating controller (140) is configured to:

determine an order to display the plurality of user profiles based on user profile rating of each user profile from the plurality of user profiles; and display the plurality of user profiles based on the determined order.

15. The apparatus (100) as claimed in claim 10, wherein the user community-driven profile rating controller (140) is configured to:

determining, by the apparatus (100), that a user profile rating from a plurality of ratings is less than a rating threshold; and performing, by the apparatus (100), at least one of:

automatically displaying a user profile corresponding to the user profile rating less than the rating threshold in a bottom portion, automatically blacklisting a user corresponding to the user profile rating less than the rating threshold and blocking an ability of the user for a specific time period to send a first message to any of the plurality of users, configuring a threshold to limit for the specific time based on a number of first messages that the user sends to other users, and applying a penalty to the user corresponding to the user profile rating less than the rating threshold based on the user profile rating of the user.

16. The apparatus (100) as claimed in claim 10, wherein the user community-driven profile rating controller (140) is configured to:

determine a first opened message fee based on the first user profile rating;

determine a second opened message fee based on the second user profile rating;

charge the first opened message fee to the first user and the second opened message fee to the second user.

17. The apparatus (100) as claimed in claim 10, wherein the user community-driven profile rating controller (140) is configured to:

determine that a user profile rating from a plurality of ratings is greater than a rating threshold; and perform at least one of:

automatically displaying a badge on a user profile corresponding to the user profile rating greater than the rating threshold, provide a user corresponding to the user profile rating greater than the rating threshold an option to include an icebreaker activity in the first message, provide the user, corresponding to the user profile rating greater than the rating threshold, an option to convert the user profile rating to a portion of a fixed profile fee, and provide the user, corresponding to the user profile rating greater than the rating threshold, an option to include an immersive virtual world meeting link in the first message.

18. The apparatus (100) as claimed in claim 10, wherein the user community-driven profile rating controller (140) is configured to:

detect a number of messages exchanged between the first user and the second user; and increment the first user profile rating and the second user profile rating based on the number of messages exchanged between the first user and the second user.

* * * * *